(12) United States Patent
Hanrahan

(10) Patent No.: US 8,316,484 B2
(45) Date of Patent: *Nov. 27, 2012

(54) DUAL LAYER MATTRESS FOR TRUCK BED

(76) Inventor: Terrence Michael Hanrahan, Mission Viejo, CA (US)

( * ) Notice: Subject to any disclaimer, the term of this patent is extended or adjusted under 35 U.S.C. 154(b) by 1130 days.

This patent is subject to a terminal disclaimer.

(21) Appl. No.: 11/527,991

(22) Filed: Sep. 26, 2006

(65) Prior Publication Data

US 2011/0225739 A1    Sep. 22, 2011

(51) Int. Cl.
*A47C 17/64* (2006.01)
*B60P 3/38* (2006.01)
*A47C 27/08* (2006.01)
*A47C 27/14* (2006.01)
*A47C 27/10* (2006.01)
*A47C 21/04* (2006.01)
*A61F 7/00* (2006.01)

(52) U.S. Cl. ............. 5/118; 5/706; 5/707; 5/710; 5/421

(58) Field of Classification Search .............. 5/118, 706, 5/420; 296/39.1, 39.2, 190.02, 24.33
See application file for complete search history.

(56) References Cited

U.S. PATENT DOCUMENTS

| 2,648,072 | A |   | 8/1953  | De Blieux |
|-----------|---|---|---------|-----------|
| D179,241  | S |   | 11/1956 | Burton et al. |
| 3,648,306 | A |   | 3/1972  | Auerbach |
| 3,696,449 | A |   | 10/1972 | Smith |
| 3,814,473 | A |   | 6/1974  | Lorenzen |
| 4,091,149 | A |   | 5/1978  | Oxendine |
| 4,136,412 | A |   | 1/1979  | Wilhelm |
| 4,396,219 | A |   | 8/1983  | Cline |
| 5,185,896 | A |   | 2/1993  | Bonda |
| 5,544,373 | A |   | 8/1996  | Chang et al. |
| 5,806,909 | A | * | 9/1998  | Wise ............................ 296/39.1 |
| 5,809,597 | A |   | 9/1998  | Shaw |
| 5,966,755 | A |   | 10/1999 | Pittman |
| 6,185,770 | B1 |  | 2/2001  | Wang |
| 6,212,718 | B1 |  | 4/2001  | Stolpmann et al. |
| 6,230,340 | B1 |  | 5/2001  | Edwards |
| 6,568,006 | B1 |  | 5/2003  | Hyland |
| 6,611,981 | B1 |  | 9/2003  | Lin |
| 6,631,526 | B1 |  | 10/2003 | Enright |
| 6,644,724 | B1 |  | 11/2003 | Penaloza et al. |
| 6,763,540 | B1 | * | 7/2004  | Wang ................. 5/710 |
| 2005/0193494 | A1 | * | 9/2005 | Lau ................... 5/706 |
| 2007/0107134 | A1 | * | 5/2007 | Pittman ............ 5/713 |

FOREIGN PATENT DOCUMENTS

GB    02105984    4/1983
WO    WO 2005032305    6/2005

* cited by examiner

*Primary Examiner* — J. Liu
(74) *Attorney, Agent, or Firm* — Joshua C. Harrison, Esq.; Barcelo, Harrison & Walker, LLP

(57) ABSTRACT

An inflatable mattress for use on a truck bed is disclosed and claimed. The inflatable mattress includes a lower mattress layer with left and right recessions dimensioned to substantially surround the wheel well sides. The inflatable mattress includes an upper mattress layer dimensioned to substantially cover the lower mattress layer and the wheel well tops.

12 Claims, 2 Drawing Sheets

DUAL LAYER MATTRESS FOR TRUCK BED

FIELD OF THE INVENTION

The present invention relates generally to cushions designed for use in vehicles, and in particular to mattresses designed for use on truck beds.

BACKGROUND

There are three conventional mattress arrangements used on truck beds today. In the first arrangement, a single-layer mattress is narrower everywhere than the truck's wheel wells. Such an arrangement can be undesirable because the wheel wells, and possibly also adjacent portions of the truck bed, are left uncovered. Accordingly, the mattress user may not be adequately cushioned from the hardness and irregular shape, nor insulated from the temperature, of the wheel wells and uncovered portions of the truck bed (if any).

In the second arrangement, a single-layer mattress is wider than the truck's wheel wells at the location of such wheel wells. Such an arrangement can be undesirable because the mattress will not lie flat and therefore its surface will curve out of plane, potentially adversely affecting the mattress user's comfort.

In the third arrangement, a single-layer mattress is shaped to include left and right recessions to receive the truck's wheel wells. Such an arrangement may be undesirable because the wheel well tops are left uncovered. Accordingly, the mattress user may not be adequately cushioned from the hardness of the wheel wells nor insulated from the temperature of the wheel wells. Alternatively, such an arrangement may be undesirable because of complexity in the mattress design that adversely affects its manufacturability and/or cost.

Thus, there is a need in the art for an improved mattress design for use on truck beds.

SUMMARY

An inflatable mattress for use on a truck bed is disclosed and claimed. The inflatable mattress includes a lower mattress layer with left and right recessions dimensioned to substantially surround the wheel well sides. The inflatable mattress includes an upper mattress layer dimensioned to substantially cover the lower mattress layer and the wheel well tops.

DESCRIPTION OF THE EXEMPLARY EMBODIMENTS

Figure 1:
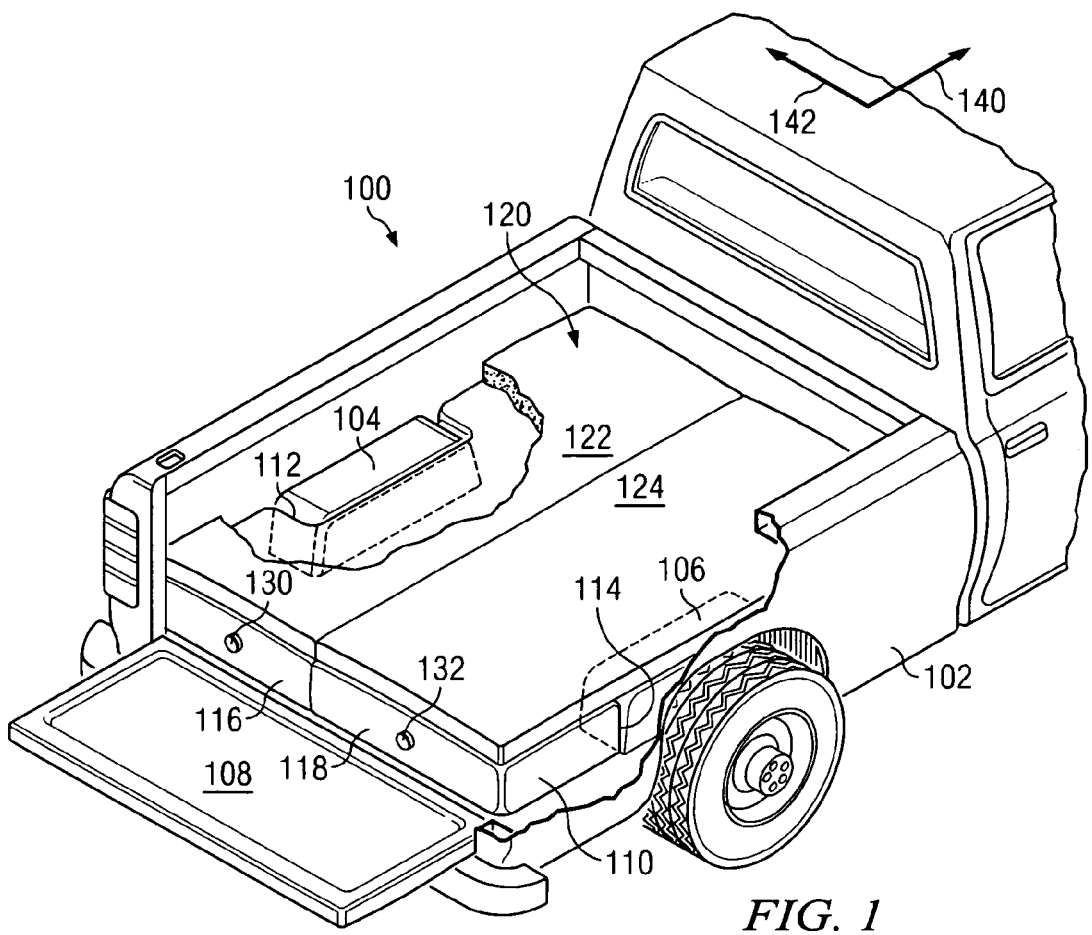
FIG. 1 depicts a mattress according to an embodiment of the present invention that has been positioned on a conventional truck bed.

FIG. 1 depicts a mattress 100 according to an exemplary embodiment of the present invention that has been positioned on a conventional truck bed 102. The truck bed 102 includes a left raised wheel well 104 and a right raised wheel well 106, each wheel well having wheel well sides and a wheel well top. The mattress 100 includes a lower mattress layer 110. The lateral sides of lower mattress layer 110 include a left recession 112 and a right recession 114. The left and right recessions 112, 114 are dimensioned to substantially surround respective wheel well sides. The mattress 100 also includes an upper mattress layer 120 dimensioned to substantially cover the lower mattress layer 110 and the wheel well tops.

The mattress 100 defines a lengthwise axis 140 (also referred to as a longitudinal axis) and a widthwise axis 142 (also referred to as a lateral axis). In certain embodiments, the lower mattress layer 110 is partitioned lengthwise into at least two sealed longitudinal chambers 116 and 118. Preferably, each of the longitudinal chambers 116 and 118 is separately inflatable via its own fluid-fill opening. For example, in the embodiment shown in FIG. 1, longitudinal chamber 116 includes left recession 112 and is inflatable via fluid-fill opening 130, whereas longitudinal chamber 118 includes right recession 114 and is inflatable via fluid-fill opening 132. As used herein, the term "fluid" includes a gas (e.g. air) and/or a liquid (e.g. water). In certain embodiments, the mattress 100 may further include a conventional electric inflation pump that may be adapted to receive electrical supply (e.g. 12 Volts) from the truck on which the mattress 100 is positioned.

Note that in the embodiment of FIG. 1 the fluid-fill openings 130 and 132 are disposed in the aft end of the lower mattress layer 110 (e.g. adjacent tailgate 108), rather than being disposed in the opposing forward end of the lower mattress layer 110. Disposing a fluid-fill opening in the aft end of the mattress may be preferred for convenient access and use of the fluid-fill opening. This preference may also apply to fluid-fill openings that pertain to the upper mattress layer 120, if any.

In certain embodiments, the upper mattress layer 120 is partitioned lengthwise into at least two longitudinal sections 122 and 124. In certain embodiments, each of the longitudinal sections 122 and 124 is a sealed chamber that is separately inflatable via its own fluid-fill opening. Alternatively upper mattress layer 120 may include a foam or fiber filler material that is not inflatable, or a foam or fiber filler layer within a chamber that is also inflatable. For example, the upper mattress layer 120 that is shown in FIG. 1 includes a foam material that is not inflatable. Foam materials may include polyether, polyester, expanded polystyrene, polyurethane foams, polycrylonitriles, reticulated foams, visco-elastic foams, and/or open or closed cell foams. Fiber fillers might encompass natural fibers such as rattan, wool, cotton, down, or may also include man made fibers such as those derived from esters, ethers or urethane bases.

The dimensions of mattress 100 may be chosen to accommodate a range of different conventional truck beds rather than only a single type of conventional truck bed. For example, in the embodiment of FIG. 1 the lower mattress layer 110 has a length measured along the longitudinal axis 140 in the range 36" inches to 98" inches, and a maximum width measured along the lateral axis 142 in the range 42" inches to 96" inches. In the embodiment of FIG. 1, the lower mattress layer 110 has a minimum width measured along the lateral axis 142 and between the left recession 112 and the right recession 114 in the range 32" inches to 64" inches. In the embodiment of FIG. 1, the lower mattress layer 110 has a thickness in the range 2" inches to 12" inches, and the upper mattress layer 120 has a thickness in the range ½" inches to 8" inches.

Figure 2:
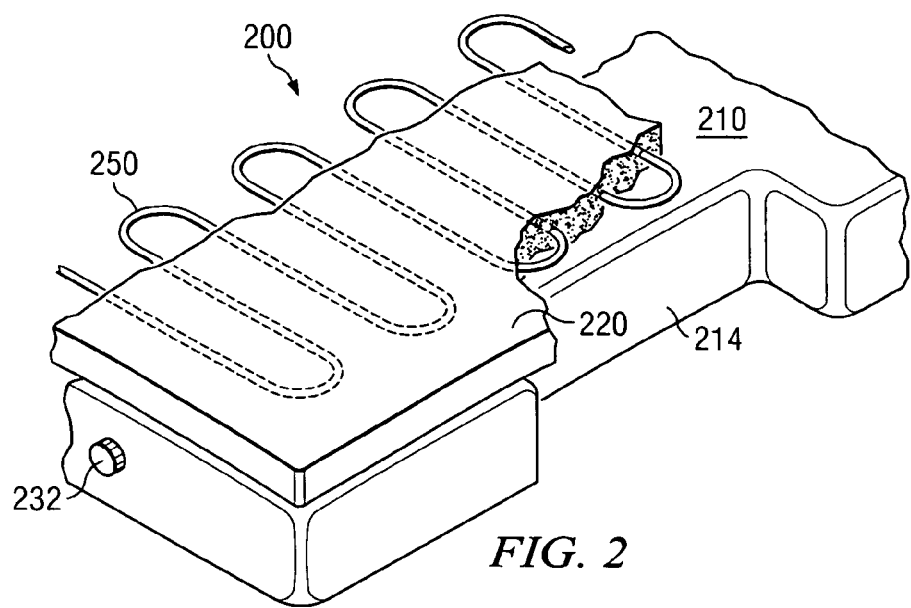
FIG. 2 depicts a portion of a mattress according to another embodiment of the present invention, the embodiment including a heating element.

FIG. 2 depicts a portion of a mattress 200 according to another embodiment of the present invention, the embodiment including a heating element 250. The mattress 200 includes a lower mattress layer 210 that includes a right recession 214. The mattress 200 also includes an upper mattress layer 220 dimensioned to substantially cover the lower mattress layer 210 and the right recession 214. Lower mattress layer 210 is inflatable via fluid-fill opening 232, whereas upper mattress layer 220 may be monolithic or may include a filler material (e.g. foam, fiber). In the embodiment of FIG. 2, the heating element 250 is disposed in the upper mattress layer 220. In certain embodiments, the heating element 250 is adapted to receive an electrical current that is provided from the truck on which the mattress 200 is positioned. For example, the electrical current may originate from a 12 volt battery in the engine compartment of the truck, and may be passed through a shutoff timer to protect the battery from excessive discharge.

In the embodiment of FIG. 2, heating element 250 is generally electrically conductive but is designed to have a resistance per unit length that is high enough to generate ample heat to warm the mattress user with practical electrical currents. In certain embodiments, a temperature sensor (e.g. thermistor) is used to facilitate control of the voltage applied to the heating element 250. In the embodiment of FIG. 2, the electrical current passed through heating element 250 is limited to prevent excessive vehicle battery discharge and/or the heating element 250 from burning, melting, or changing the properties of the foam or fiber filler material used in upper mattress layer 220.

For example, in the embodiment of FIG. 2, heating element 250 may comprise six lengths of 24 gauge copper wire that are sewn into the upper mattress layer 220 in approximately equally spaced longitudinal orientations, and are electrically connected in series. The total length of the 24 gauge copper wire is then approximately 460 inches, with a wire cross-sectional area of approximately 0.000318 square inches. The copper has a specific electrical resistance of 0.661 µOhm-inches, and so the total resistance of the series combination of wire lengths will be approximately 0.96 Ohms. During operation, approximately 12 Volts is applied to the heating element 250, drawing approximately 12.5 Amps from the vehicle battery and producing 150 Watts of heating in the upper mattress layer 220. In this embodiment, the total vehicle battery discharge over an eight hour period of use is approximately 100 Amp-hours.

In an alternative exemplary embodiment, 28 gauge copper wire is used in heating element 250, instead of 24 gauge wire. This increases the total electrical resistance to approximately 2.4 Ohms, reduces the current draw to approximately 5 Amps, and produces approximately 60 Watts of heating in the upper mattress layer 220. In this alternative embodiment, the total vehicle battery discharge over an eight hour period of use is approximately 40 Amp-hours.

Figure 3:
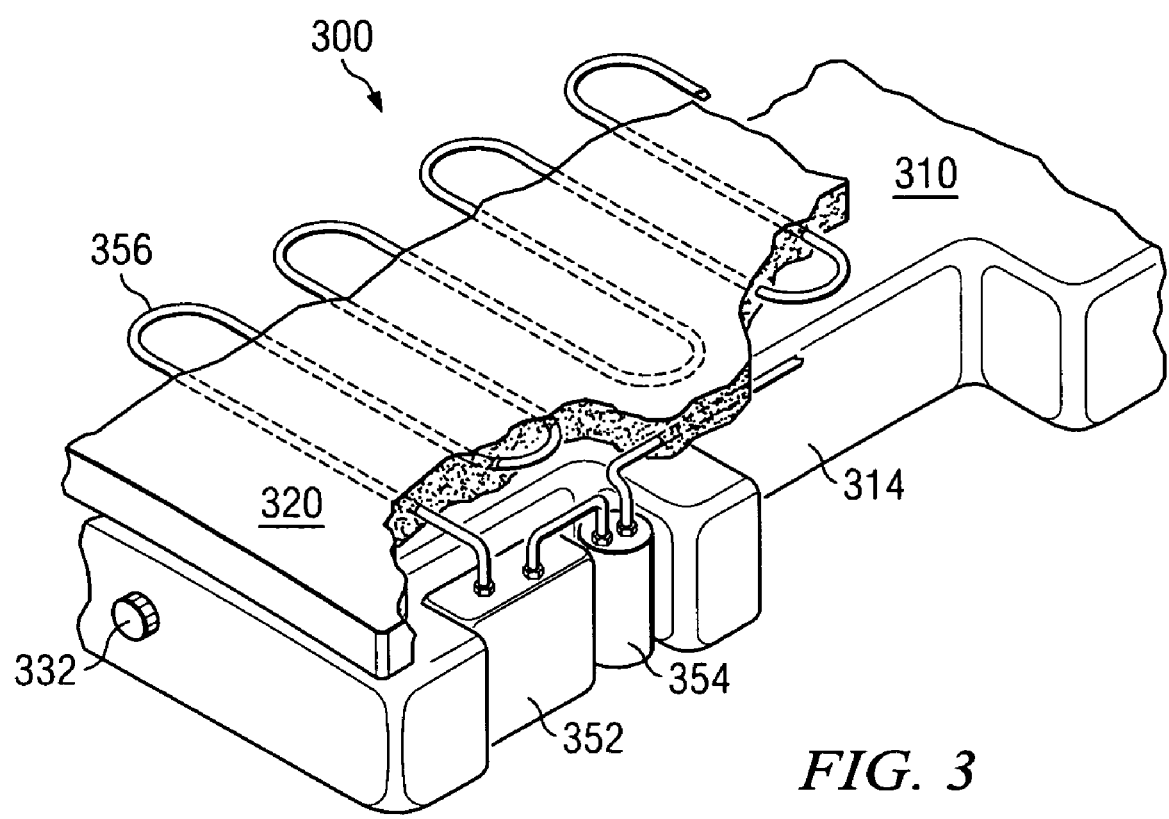
FIG. 3 depicts a portion of a mattress according to another embodiment of the present invention, the embodiment including at least a portion of a cooling system.

FIG. 3 depicts a portion of a mattress 300 according to another embodiment of the present invention, the embodiment including at least a portion of a cooling system. The mattress 300 includes a lower mattress sub-layer 310 that includes a right recession 314. The mattress 300 also includes an upper mattress sub-layer 320 dimensioned to substantially cover the lower mattress sub-layer 310 and the right recession 314. Lower mattress sub-layer 310 is inflatable via fluid-fill opening 332, whereas upper mattress sub-layer 320 includes a foam or fiber filler material. The cooling system, a portion of which is shown in FIG. 3, is an evaporative cooling system and includes a water reservoir 352, water pump 354, and a at least one water distribution tube 356. However a closed cycle cooling system, and/or a cooling system in which the working fluid is not water, may also be used with mattress 300. In the embodiment of FIG. 3, the water distribution tube 356 is serpentine in shape and is disposed in the upper mattress sub-layer 320.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

I claim:

1. An inflatable mattress for use on a truck bed, the truck bed having left and right raised wheel wells, each wheel well having wheel well sides and a wheel well top, the inflatable mattress comprising:
   an inflatable lower mattress layer that includes left and right recessions dimensioned to substantially surround the wheel well sides; and
   an inflatable upper mattress layer dimensioned to substantially cover the lower mattress layer and the wheel well tops.

2. The inflatable mattress of claim 1 wherein the upper mattress layer is partitioned lengthwise into at least two sealed longitudinal chambers, each chamber separately inflatable via its own fluid-fill opening.

3. The inflatable mattress of claim 1 wherein the lower mattress layer is partitioned lengthwise into at least two sealed longitudinal chambers, each chamber separately inflatable via its own fluid-fill opening.

4. The inflatable mattress of claim 1 wherein the upper mattress layer comprises a filler material selected from the group consisting of a foam filler material or a fiber filler material.

5. The inflatable mattress of claim 1 wherein the lower mattress layer further comprises an aft end and an opposing forward end, and wherein the aft end includes at least one fluid-fill opening.

6. The inflatable mattress of claim 1 wherein the upper mattress layer further comprises an aft end and an opposing forward end, and wherein the aft end includes at least one fluid-fill opening.

7. The inflatable mattress of claim 1 further comprising an electric inflation pump.

8. The inflatable mattress of claim 1 wherein the lower mattress layer has a length in the range 36 inches to 98 inches.

9. The inflatable mattress of claim 1 wherein the lower mattress layer has a maximum width in the range 42 inches to 84 inches.

10. The inflatable mattress of claim 1 wherein the lower mattress layer has a minimum width measured between the left and right recessions in the range 32 inches to 64 inches.

11. The inflatable mattress of claim 1 wherein the lower mattress layer has a thickness in the range 2 inches to 12 inches.

12. The inflatable mattress of claim 1 wherein the upper mattress layer has a thickness in the range ½ inches to 8 inches.

* * * * *